A. FERGUSON.
LEVEL ATTACHMENT FOR THRESHING MACHINES.
APPLICATION FILED JUNE 11, 1908.
913,206.
Patented Feb. 23, 1909.
2 SHEETS—SHEET 1.
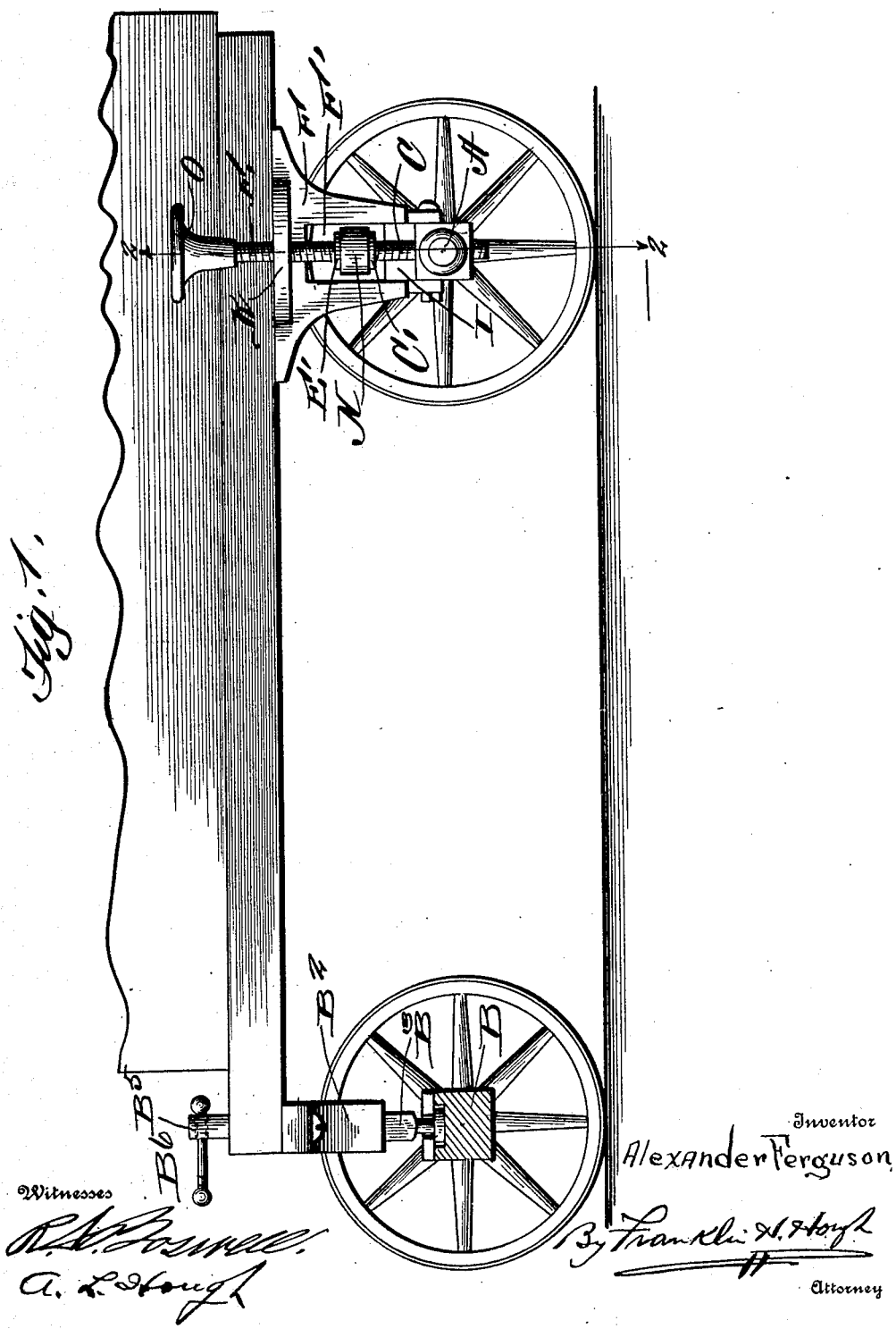

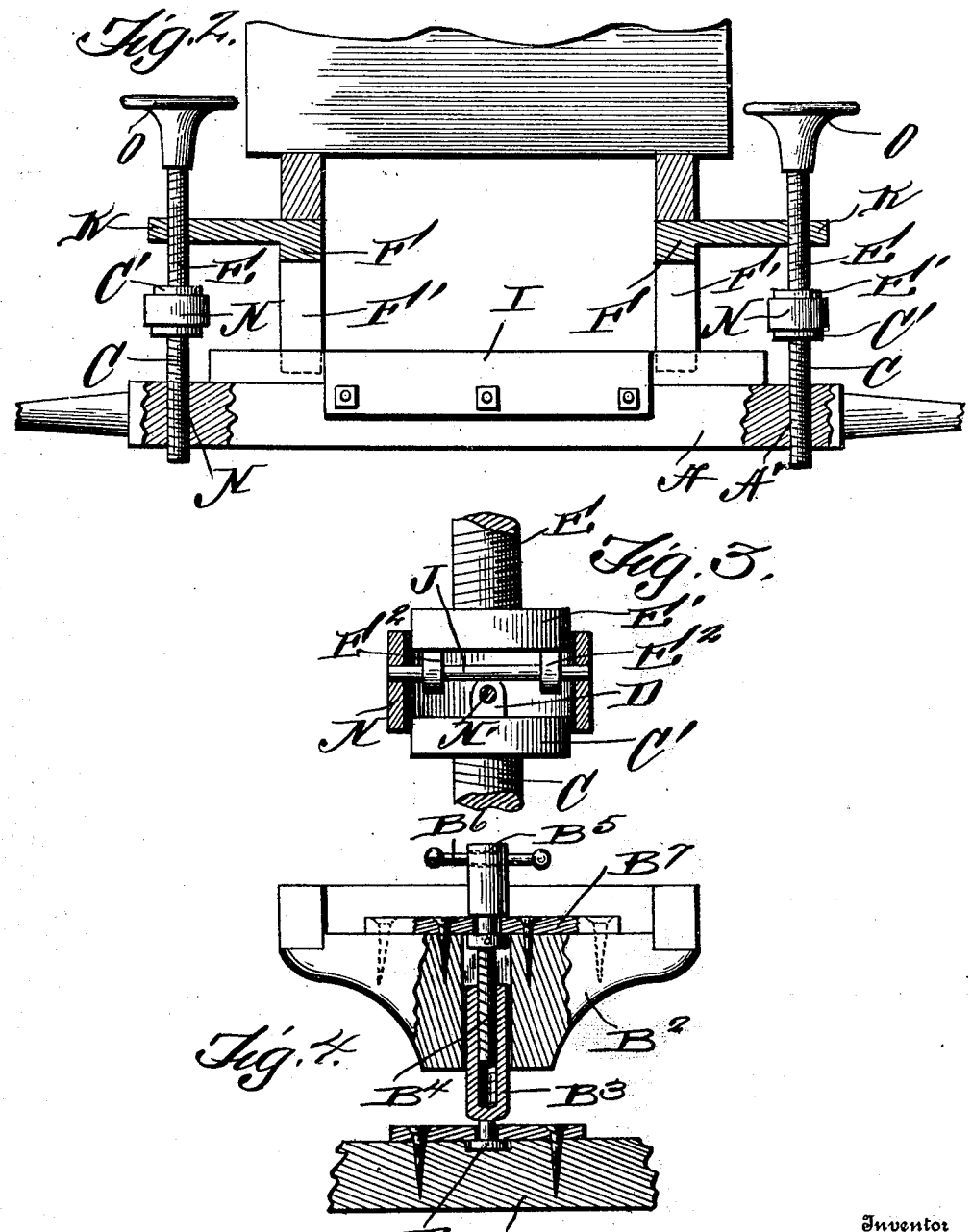

UNITED STATES PATENT OFFICE.

ALEXANDER FERGUSON, OF LANESBORO, MINNESOTA.

LEVEL ATTACHMENT FOR THRESHING-MACHINES.

No. 913,206.  Specification of Letters Patent.  Patented Feb. 23, 1909.

Application filed June 11, 1908. Serial No. 437,983.

*To all whom it may concern:*

Be it known that I, ALEXANDER FERGUSON, a citizen of the United States, residing at Lanesboro, in the county of Fillmore and State of Minnesota, have invented certain new and useful Improvements in Level Attachments for Threshing-Machines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for leveling threshing machines, and comprises various details of construction, combinations and arrangements of parts which will be hereinafter fully described and then specifically defined in the appended claim.

My invention is illustrated in the accompanying drawings, in which:—

Figure 1 is a side elevation of my invention. Fig. 2 is a vertical longitudinal section through an axle and attachments showing the means for raising and lowering the frame, and Fig. 3 is an enlarged detail view showing the swivel connections between the leveling screws. Fig. 4 is an enlarged detail view, partly in section, of an axle with its attachments.

Reference now being had to the details of the drawings by letter, A designates the rear axle of the apparatus and B the forward axle. Said rear axle has threaded openings A' therein adapted to receive the left threaded screws C. Each of said screws C has a head C' with apertured lugs D projecting therefrom, and E designates a right threaded screw having a head E' with lugs E² which are apertured projecting from the face thereof.

F designates metallic plates, cast or malleable, each of which is provided with a recess F for the reception of the axle, as shown in the drawings. A flanged bolster I rests upon said axle A and has contracted portions which extend through the recesses in said castings F. Each of the latter is provided with a projection K having a threaded aperture therein for the reception of the threaded screw E and a hand or finger wheel O is fixed to the screw whereby the latter may be readily turned.

N designates a circular band having a pin N' passing diametrically therethrough and engages behind a pin J carried by the apertured lugs upon the head of the screw E. It will be noted that the pin J passes through the apertures in the lugs of the left threaded screw C. When the ends of the right and left threaded screws are connected together in the manner shown and described, it will be noted that all binding incident to a single straight screw without universal joint will be avoided. The universal joint brings the screws always in the center regardless of the position of the machine and without any binding.

Mounted in an aperture in the bolster B² over the front axle is a metallic boxing B³ having a longitudinal opening, the wall of which is threaded for the reception of a screw B⁴, the head of which screw B⁴ is apertured as at B⁵ for the reception of a pin B⁶ whereby the screw may be turned. The screw B⁴ is swiveled in the plate B⁷ mounted upon the bolster B² and, by turning the screw B⁴, the boxing B³ may be raised and lowered. Swivelly mounted upon the front axle is a swivel head R upon which the lower end of the boxing B³ rests and forms a bearing therefor.

From the foregoing, it will be noted that, by the provision of the apparatus as shown and described, a simple and efficient means is afforded for leveling a threshing machine and so arranged that all binding incident to the raising mechanism, in which straight screws are employed, is dispensed with, the universal joints between the right and left threaded screws affording means for centering the screws at all times without any binding.

What I claim to be new is:—

An apparatus for leveling threshing machines comprising axles, each of which is provided with threaded apertures, a frame mounted upon said axle, castings fastened to the frame and having each a recess therein for the reception of said axle, a flanged bolster upon the axle having contracted portions extending through said castings, a projection upon each of the latter provided with a threaded aperture, screws passing through apertures in said projections, and a universal joint connecting said screws, as set forth.

In testimony whereof I hereunto affix my signature in the presence of two witnesses.

ALEXANDER FERGUSON.

Witnesses:
O. M. HABBERSTEED,
JOHN MCCALLUM.